March 11, 1924. 1,486,322
F. F. CHOITZ
TREAD INCREASING MEANS FOR TRACTION WHEELS
Filed March 15, 1923 2 Sheets-Sheet 1

Inventor
Frederick F. Choitz
By Joshua R. H. Potts
Attorney

March 11, 1924. 1,486,322
F. F. CHOITZ
TREAD INCREASING MEANS FOR TRACTION WHEELS
Filed March 15, 1923 2 Sheets-Sheet 2
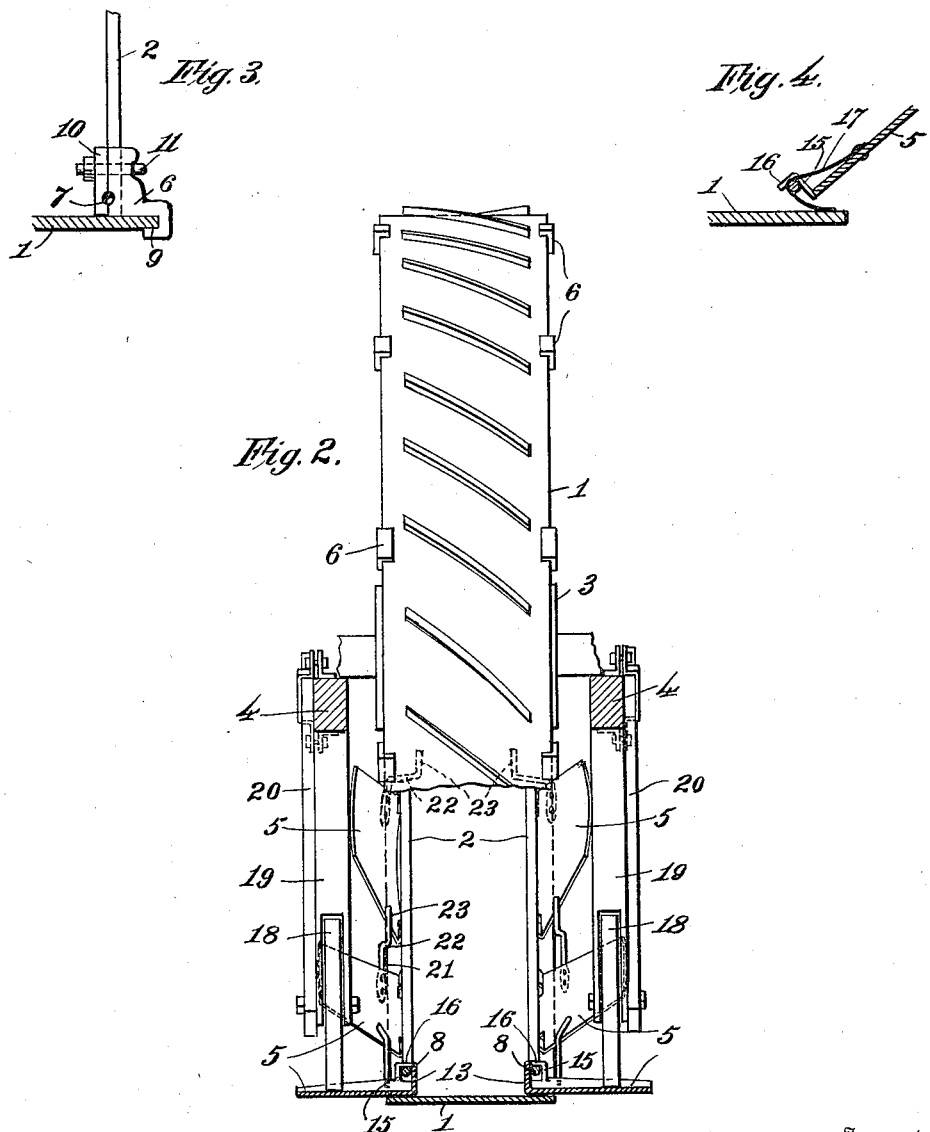

Patented Mar. 11, 1924.

1,486,322

UNITED STATES PATENT OFFICE.

FREDERICK F. CHOITZ, OF ELLSWORTH, KANSAS.

TREAD-INCREASING MEANS FOR TRACTION WHEELS.

Application filed March 15, 1923. Serial No. 625,351.

*To all whom it may concern:*

Be it known that I, FREDERICK F. CHOITZ, a citizen of the United States, residing at Ellsworth, county of Ellsworth, and State of Kansas, have invented certain new and useful Improvements in Tread-Increasing Means for Traction Wheels, of which the following is a specification.

My invention relates to wheels and particularly to traction wheels for agricultural machines, engines and the like. More specifically, my invention relates to means for increasing the tread of traction wheels when found necessary or desirable.

The object of my invention is to provide means for increasing the tread of traction wheels, which shall be of such construction and operation as not to interfere in any way with the frame or other parts of the vehicle on which the same is used.

A further object of by invention is to provide means for increasing the tread of wheels, as mentioned, which may be attached to practically any ordinary traction wheel such as employed in agricultural machines, traction engines and the like.

A further object of my invention is to provide a device of the character mentioned, which may be thrown into or out of operation as desired. Other objects of my invention will appear hereinafter.

With these objects in view, my invention consists generally in a plurality of wings hingedly mounted between the spokes of a traction wheel, means for normally maintaining the same in elevated, raised or inoperative position, a presser member for holding the lowermost wing or wings in laterally extended or lowered position, and means on each wing for initially depressing the next wing into the path of the presser member.

My invention further consists in means adapted to be attached to the spokes, adjacent the rim of the wheel for hingedly mounting the wings whereby the device may be readily applied to substantially any traction wheel.

My invention further consists in a device as mentioned in which the presser member may be moved into or out of operative position, as found necessary or desirable.

My invention further consists in various details of construction and arrangements of parts, all as will be fully described hereinafter and particularly pointed out in the claims.

My invention will be more readily understood by reference to the accompanying drawings forming a part of this specification and in which:—

Fig. 2 is an edge view of the same, the lower portion of the wheel rim being illustrated as broken away to show the construction.

Fig. 3 is an enlarged detail of the device for attaching the wings to the wheel, and Fig. 4 is a detail section of one of the wings and the adjacent part of the rim illustrated upon an enlarged scale.

Figure 1:
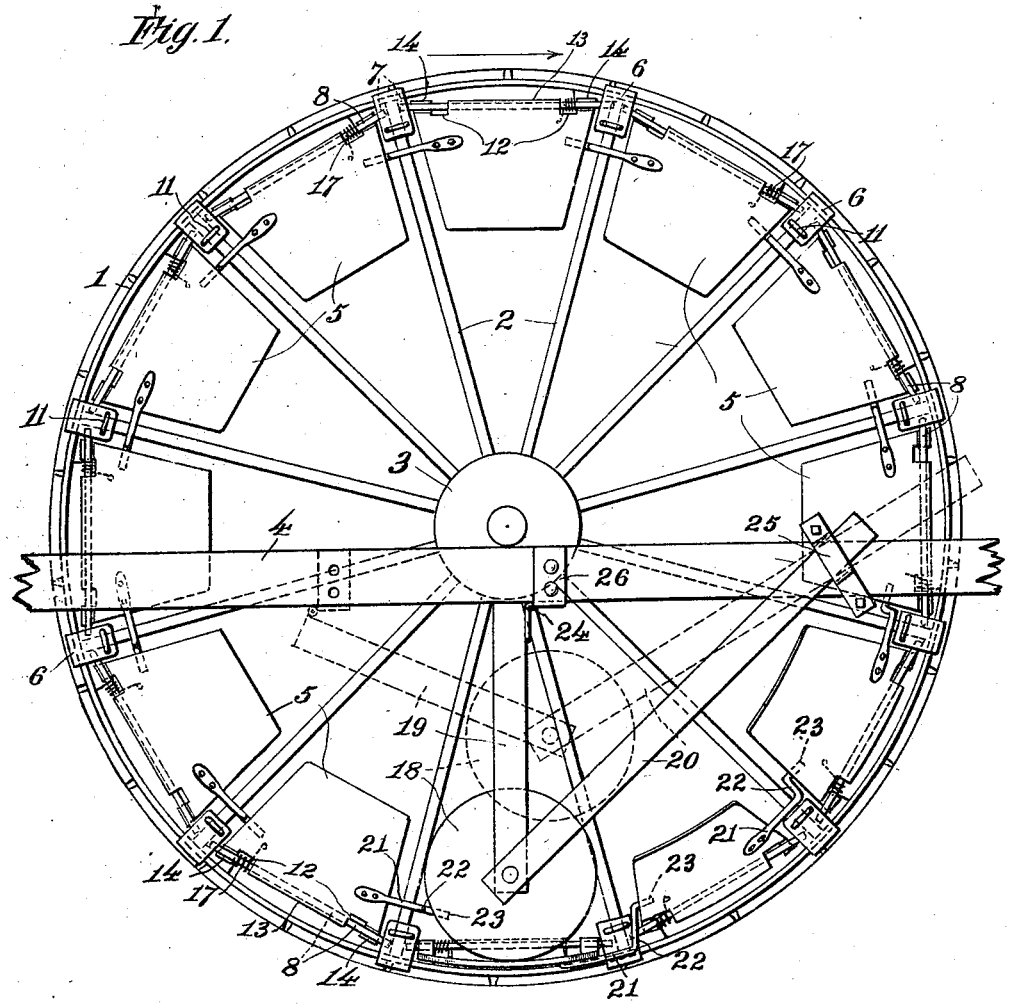
Fig. 1 is a side elevation of a wheel equipped with a tread increasing device embodying my invention.

Referring now to the drawings, 1 indicates the rim of a traction wheel of any ordinary form. 2 the spokes and 3 the hub thereof. The frame of the agricultural machine or other vehicle is indicated diagrammatically at 4.

Hingedly mounted between the spokes is a series of wings 5. These wings are hinged close to the rim 1 so that when they are swung outwardly, they will be substantially in alinement with and form a lateral continuation or extension of the rim, as shown in Fig. 2.

The wings are curved transversely to conform to the curvature of the rim 1, when extended, and may be hingedly mounted in any desired manner. However, I have illustrated an efficient way of mounting them which also provides means whereby the device may be secured as an attachment to practically any traction wheel. To this end castings 6 are provided at the outer end of each spoke, and these are formed with sockets 7 to receive the ends of hinge pins 8 upon which the wings are swingingly mounted. These castings are formed to receive the adjacent portion of the spoke and are grooved, as at 9, to receive the edge of the rim 1. A backing plate 10 is provided against the inner face of the spoke, and the casting 6 and plate 10 are securely held in place by a U-bolt 11. It is obvious that with this construction, the device may be readily attached to practically any traction wheel, and that without changing the wheel or requiring the services of a mechanic.

The hinged end of each wing is recessed as at 12 adjacent each side, forming a broad central tongue 13 which is turned inwardly at substantially right angles against one side of the hinge pin 8; and two side tongues 14 which are turned inwardly against the opposite side of the pin 8, as indicated at 15, and then downwardly as indicated at 16. See Fig. 4. This construction hingedly connects the wing to the hinge pin. Arranged in one or both of the recesses 12 is a spring or springs 17 which normally keeps the wings raised or in inoperative position.

Means are provided for extending the wings as they approach the ground; and other means are provided for maintaining the lowermost, extended wing in position to help sustain the vehicle, the former being so arranged as to permit each wing to return immediately to inoperative position as soon as it passes the last mentioned means.

The means for holding the wings in operative or sustaining position comprises a wheel 18 mounted upon a suitable bracket depending from the frame of the vehicle. This may be of any desired form but preferably comprises a normally vertical member 19 upon which the wheel is mounted and a brace bar 20. The wheel 18 is so positioned that its periphery will engage the inner faces of the wings as they pass under the same, and hold the wings in extended position substantially in alinement with the wheel rim 1. See Figs. 1 and 2.

To extend the wings, each wing is provided with a Z-arm 21, which extends laterally therefrom beyond the adjacent spoke 2, then bent inwardly as at 22 and then laterally as at 23 to engage behind the next wing in order. The position 22 of the arm is so proportioned as to bring the next wing to the lowermost one down sufficiently to engage under the periphery of the wheel 18, yet of sufficient length not to begin to extend the wings until they are below the frame 4 of the vehicle. By this construction the wings, as soon as they pass from beneath the wheel 18, are free to immediately return to normal or folded position.

When the nature of the roadway or ground is such as not to necessitate the use of the wings, the wheel 18 may be moved to inoperative position which will allow the traction wheel to revolve without extending any of the wings. This may be done in any way found convenient, but I have illustrated conventionally a manner which is efficient. As shown the member 19 is hingedly mounted, as at 24, and the end of the bar 20 is adjustably connected at 25 to the frame 4. With this arrangement the wheel 18 may be swung upwardly to inoperative position. If desired the hinge 24 may be arranged on a bracket 26 which may be shifted to another position as indicated in dotted lines, in Fig. 1.

The wings may be arranged to extend on one side only of the wheel or on both sides thereof, and in the drawings I have illustrated the latter, thereby giving the wheel substantially double its normal tread.

I claim:

1. A wheel including the spokes and rim, in combination with a series of wings hingedly mounted between the spokes adjacent the rim to swing outwardly from the wheel, a presser member for engaging the upper face of the lowermost wing when extended, and means on each wing for moving the succeeding wing into position to be engaged by said presser member, substantially as described.

2. A device as set forth in claim 1, in which the means on each wing for moving the successive wing comprises a Z-arm fixed at one end to the wing and having the opposite end extend behind the next wing, substantially as described.

3. A device as set forth in claim 1, further characterized by means for moving the presser member into and out of operative position.

4. A wheel including the spokes and rim, in combination with bearing members attached to the spokes adjacent the rim, hinge pins having their ends in said members, wings swingingly mounted on said hinge pins, a presser member for engaging the lowermost wing when extended, and means for swinging each wing into the path of the presser member, substantially as described.

5. A device as set forth in claim 1 in which the presser member comprises a wheel and a bracket supporting the wheel, said bracket being adjustable to move said wheel into and out of operative position, substantially as described.

6. A device as set forth in claim 4, in which the bearing members are provided with grooves to receive the adjacent edge of the wheel rim, substantially as described.

7. In a device of the class described, a wheel having the spokes and rim, in combination with a hinge pin arranged adjacent the rim, a wing having the inner end recessed to form a central tongue and side tongues, said central tongue and said side tongues being bent to engage about said hinge pin in opposite directions and means for moving said wing into operative position, substantially as described.

8. A device as set forth in claim 7 further characterized by a presser member for holding said wing in operative position when at the lowermost portion of the wheel and a spring arranged in the recess between said tongues for raising said wing after it passes said presser member, substantially as described.

In testimony whereof I have signed my name to this specification in the presence of two subscribing witnesses.

FREDERICK F. CHOITZ.

Witnesses:
R. A. PFLUGHOIFT,
O. E. P. SCHULZ.